(12) United States Patent
Seok et al.

(10) Patent No.: US 11,503,638 B2
(45) Date of Patent: Nov. 15, 2022

(54) SECONDARY CHANNEL SPATIAL REUSE IN A WIRELESS NETWORK

(71) Applicant: MediaTek Singapore Pte. Ltd., Singapore (SG)

(72) Inventors: Yongho Seok, San Jose, CA (US); James June-Ming Wang, San Jose, CA (US); Chao-Chun Wang, San Jose, CA (US); Chih-Shi Yee, San Jose, CA (US)

(73) Assignee: MEDIATEK SINGAPORE PTE LTD., Singapore (SG)

( * ) Notice: Subject to any disclaimer, the term of this patent is extended or adjusted under 35 U.S.C. 154(b) by 243 days.

(21) Appl. No.: 17/018,781

(22) Filed: Sep. 11, 2020

(65) Prior Publication Data

US 2020/0413445 A1 Dec. 31, 2020

Related U.S. Application Data

(62) Division of application No. 16/167,395, filed on Oct. 22, 2018, now Pat. No. 10,785,798.

(51) Int. Cl.
| | |
|---|---|
| *H04L 12/28* | (2006.01) |
| *H04W 74/08* | (2009.01) |
| *H04W 16/10* | (2009.01) |
| *H04L 5/00* | (2006.01) |
| *H04W 72/04* | (2009.01) |
| *H04J 1/16* | (2006.01) |
| *H04W 84/12* | (2009.01) |

(52) U.S. Cl.
CPC ....... *H04W 74/0816* (2013.01); *H04L 5/0053* (2013.01); *H04W 16/10* (2013.01); *H04W 72/0453* (2013.01); *H04W 72/0473* (2013.01); *H04W 74/0808* (2013.01); *H04W 84/12* (2013.01)

(58) Field of Classification Search
CPC ............. H04W 16/10; H04W 73/0453; H04W 72/0473
USPC ......................................... 370/252, 329, 430
See application file for complete search history.

(56) References Cited

U.S. PATENT DOCUMENTS

| | | | | |
|---|---|---|---|---|
| 2022/0038317 | A1* | 2/2022 | Lim | ................... H04L 27/26025 |
| 2022/0061051 | A1* | 2/2022 | Song | ................... H04W 72/0453 |
| 2022/0110119 | A1* | 4/2022 | Song | ................... H04W 72/042 |

\* cited by examiner

*Primary Examiner* — John Pezzlo

(57) ABSTRACT

A data unit (e.g., a physical layer convergence procedure (PLCP) protocol data unit (PPDU)) is detected at a first wireless device of a basic service set (BSS). The data unit was sent on a channel from a second wireless device of an overlapping basic service set (OBSS). The data unit is wide-bandwidth, occupying both a primary channel and a secondary channel of the wireless network. The first and second wireless devices are within a same spatial reuse group (SRG). The first wireless device stores the channel bandwidth of the data unit and a receive duration time of the data unit. During the receive duration time of the data unit, a SRG OBSS power density threshold is applied on the secondary channels that are within the channel bandwidth of the data unit, instead of applying a non-SRG OBSS power density threshold on those secondary channels.

20 Claims, 6 Drawing Sheets

SECONDARY CHANNEL SPATIAL REUSE IN A WIRELESS NETWORK

RELATED APPLICATIONS

This application is a continuation (divisional) of U.S. patent application Ser. No. 16/167,395, entitled "Secondary Channel Spatial Reuse in a Wireless Network," filed on Oct. 22, 2018, by Yongho Seok et al., which claims priority to U.S. Provisional Application No. 62/576,767, entitled "RTS and CTS Procedure for SRG SR," filed on Oct. 25, 2017, to U.S. Provisional Application No. 62/597,476, entitled "SR Mechanism for RTS and CTS," filed on Dec. 12, 2017, and to U.S. Provisional Application No. 62/616,595, entitled "Secondary Channel SR," filed on Jan. 12, 2018, all of which are hereby incorporated by reference in their entirety.

BACKGROUND

Wireless devices are becoming widely prevalent, and requests for access to wireless channels are increasing. Efficient use of the resources in a wireless local-area network (WLAN) is important to provide bandwidth and acceptable response times to the users of the WLAN.

A next generation WLAN, known as High-Efficiency (HE) WLAN (HEW), is being developed and defined in the IEEE 802.11ax standard. HEW aims at improving the performance of high-capacity, high-data rate services while supporting concurrent accesses in an environment in which a number of basic service sets (BSSs) are densely deployed and the coverage areas of the BSSs overlap (each BSS includes an access point (AP) and a number of wireless stations (STAs) associated with the AP).

A primary channel is defined as a common channel for all STAs within a BSS. If a STA uses a channel width larger than the channel width of the primary channel, the STA may use another channel in addition to the primary channel. The additional channel is referred to as a secondary channel.

To improve performance and make more efficient use of limited frequency-spectrum resources in environments where BSSs are densely deployed; the IEEE 802:11 ax standard implements a spatial reuse technique. In spatial reuse, STAs may spatially reuse frequencies or channels of the wireless medium.

While the IEEE 802.11ax standard addresses spatial reuse, it does not define mechanisms for ignoring or managing traffic from overlapping BSSs (OBSSs) to avoid unnecessary contention when accessing channels, particularly secondary channels.

More specifically, according to IEEE 802.11ax, the OBSS signal detection or power density (OBSS_PD) level on secondary channels is set two different ways. First, when a STA receives an OBSS frame occupying a primary channel, the OBSS_PD level applied on the primary channel is commonly applied on secondary channels. Accordingly, the transmit power limit set by the OBSS_PD level on the primary channel is also applied to secondary channels. Second, even when a STA does not receive an OBSS frame occupying a primary channel, the default OBSS_PD level is applied on secondary channels.

SUMMARY

Embodiments according to the present invention address the issues described above by providing methods (and devices and networks that implement those methods) for spatially reusing channels, particularly secondary channels.

In embodiments, a data unit (e.g., a physical layer convergence procedure (PLCP) protocol data unit (PPDU)) is detected at a first wireless device of a basic service set (BSS). The data unit was sent on a channel from a second wireless device of an overlapping basic service set (OBSS). The data unit is wideband, occupying both a primary channel and a secondary channel of the wireless network. The first wireless device and the second wireless device, although in different BSSs, are within a same spatial reuse group (SRG).

In these embodiments, the first wireless device stores the channel bandwidth of the data unit and a receive duration time of the data unit. More specifically, in an embodiment, if the first wireless device detects but ignores the data unit (e.g., it does not set a network allocation vector (NAV) timer based on frames in the data unit, and it resets the state of a clear channel assessment for the channel from busy to idle before all frames of the data unit are received by the first wireless device), then the first wireless device stores the channel bandwidth of the data unit and the receive duration time of the data unit. During the receive duration time of the data unit, a SRG OBSS power density (signal detection) threshold is applied on the secondary channels that are within the channel bandwidth of the data unit, instead of applying a non-SRG OBSS power density threshold on those secondary channels.

In an embodiment, a non-SRG OBSS power density threshold is applied to secondary channels that are not within the channel bandwidth of the data unit.

In embodiments, the SRG OBSS power density threshold range is −72 decibel-milliwatts (dBm) to −62 dBm as a function of transmit power, and the non-SRG power density threshold range is −82 dBm to −62 dBm as a function of transmit power.

Thus, the minimum SRG OBSS power density (signal detection) threshold is increased on the secondary channels that are within the channel bandwidth of the data unit, during the receive duration time of the data unit. In other words, relative to the non-SRG OBSS power density threshold range, the SRG OBSS power density threshold range is narrowed; specifically, its lower threshold is raised on the secondary channels that are within the channel bandwidth of the data unit. As a result, weaker inter-BSS signals on those channels will not cause those secondary channels to be identified as being busy. Instead, those secondary channels can be identified as being idle and available for spatial reuse. With more channels available, overall network-level performance is increased.

Embodiments according to the present invention thus improve computer technologies (e.g., by improving the efficiency and performance of wireless communication devices) and computer-related technologies (e.g., by improving the quality and performance of wireless networks).

These and other objects and advantages of the various embodiments according to the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments according to the present invention and, together with the detailed description, serve to explain the principles of the invention.

DETAILED DESCRIPTION

Figure 1:
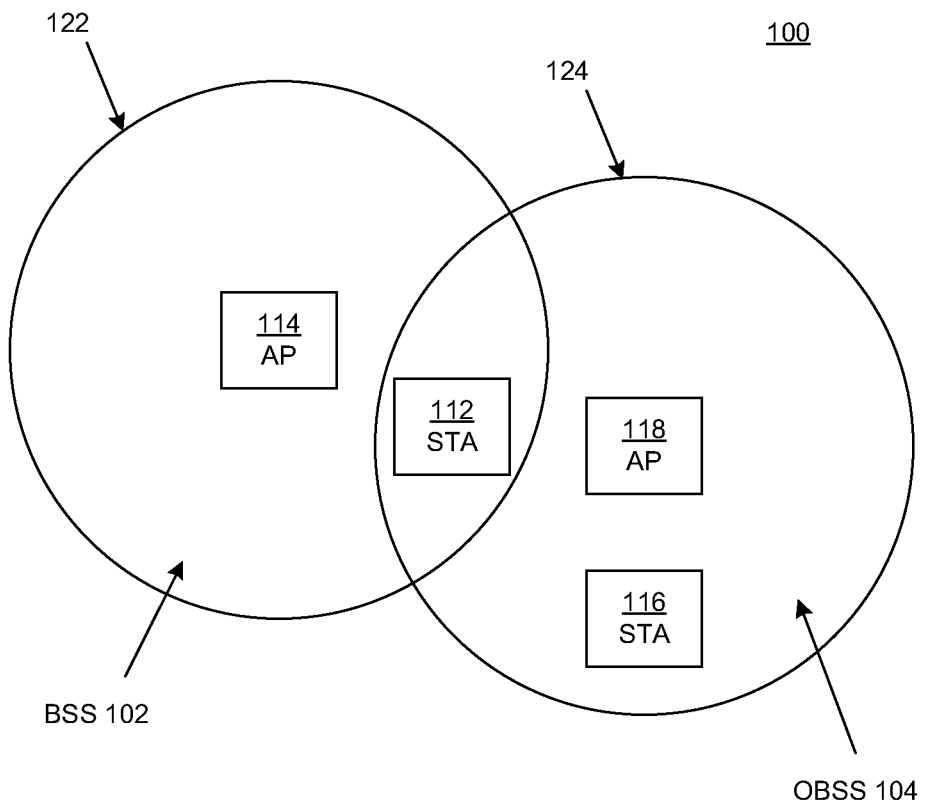
FIG. 1 is a block diagram of an example of a wireless network in which embodiments according to the present invention can be performed.

Reference will now be made in detail to the various embodiments according to the present invention, examples of which are illustrated in the accompanying drawings. While described in conjunction with these embodiments, it will be understood that they are not intended to limit the invention to these embodiments. On the contrary, the disclosure is intended to cover alternatives, modifications and equivalents, which may be included within the spirit and scope of the disclosure as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "sending," "transmitting," "determining," "indicating," "identifying," "detecting," "storing," "applying," "ignoring," "disregarding," "resetting," "not setting," or the like, refer to actions and processes (e.g., the flowchart 500 of FIG. 5) of a computing system or similar electronic computing device or processor (e.g., the device 300 of FIG. 3). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a wireless network 100 in which embodiments according to the present invention can be performed. The network 100 may be referred to as a wireless local area network (WLAN). In embodiments, the network 100 is a High-Efficiency (HE) WLAN (HEW) and is compliant with the IEEE 802.11ax standard.

In the example of FIG. 1, the network 100 includes a first basic service set (BSS) 102 and a second BSS 104. The circles 122 and 124 indicate the respective coverage areas of the BSSs 102 and 104. The coverage area 124 of the BSS 104 overlaps the coverage area 122 of the BSS 102, and so (from the perspective of the BSS 102) the BSS 104 is referred to as an overlapping BSS (OBSS).

The BSS 102 includes a number of wireless devices exemplified by the station (STA) 112 and the access point (AP) 114, and the OBSS 104 includes a number of wireless devices exemplified by the STA 116 and the AP 118. In the example of FIG. 1, the STA 112 contends for traffic with other STAs (not shown) in the BSS 102 and then exchanges data with the AP 114, but would also be able to receive traffic from the OBSS 104 because it is in both the coverage area of the OBSS and the coverage area of its own BSS.

Data units exchanged by the APs and STAs may include control information or data. At the physical (PHY) layer, these data units may be referred to as physical layer convergence procedure (PLCP) protocol data units (PPDUs). In some aspects, a PPDU may be referred to as a packet or physical layer packet. Each PPDU may include a preamble and a payload. The payload may include a media access control (MAC) header or data for other layers and/or user data, for example.

The STA 112 and the STA 116, although in different BSSs, can be within a same spatial reuse (SR) group (SRG). A SRG includes devices of the wireless network 100 that use one set of SR parameters for PPDUs from STAs and APs within the SRG, and another set of SR parameters for PPDUs from STAs and APs that are not part of the SRG (non-SRG).

According to IEEE 802.11ax, SRG and non-SRG frames can be determined as follows. A STA that has received a SR Parameter Set element from its associated AP with a value of one in the SRG Information Present subfield uses information provided in the SR Parameter Set element to identify BSSs that are members of the STA's SRG to determine whether or not a received inter-BSS PPDU is an SRG PPDU. A received PPDU that is an inter-BSS PPDU is an SRG PPDU if the bit in the SRG BSS Color Bitmap field which corresponds to the numerical value of the BSS_COLOR parameter of the RXVECTOR is set to one. A received very high throughput (VHT) PPDU that is an inter-BSS PPDU is an SRG PPDU if the GROUP_ID parameter of the RXVECTOR has a value of zero and the bit in the SRG Partial BSSID Bitmap field that corresponds to the numerical value of PARTIAL_AID[0:5] of the RXVECTOR is set to one. A received PPDU that is an inter-BSS PPDU is an SRG PPDU if BSSID information from a MAC protocol data unit (MPDU) of the PPDU is correctly received and the bit in the SRG Partial BSSID Bitmap field that corresponds to the numerical value of BSSID[39:44] is set to one; otherwise, the PPDU is not determined to be an SRG PPDU. A STA that has not received a SR Parameter Set element from its associated AP with a value of one in the SRG Information Present subfield does not classify any received PPDUs as an SRG PPDU.

When a STA that receives the SR Parameter Set element with the SRG Information Present subfield equal to one from its associated AP obtains a transmission opportunity (TXOP), it can use a VHT/HE PPDU format to initiate a request to send (RTS)/clear to send (CTS) mechanism. If a RTS frame is carried in an inter-BSS PPDU of a VHT or an HE PPDU format, it can be determined to be an SRG PPDU by meeting one of the following conditions: 1) the RXVECTOR parameter GROUP_ID of the received VHT PPDU is set to zero and the bit in the SRG Partial BSSID Bitmap field that corresponds to the numerical value of PARTIAL_AID [0:5] of the RXVECTOR is set to one; 2) the RXVECTOR parameter GROUP_ID of the received VHT PPDU is set to 63 and the bit in the SRG Partial BSSID Bitmap field that corresponds to the numerical value of the transmitter address (TA) [39:44] is set to one; 3) the RXVECTOR parameter UPLINK_FLAG of the received HE PPDU is set to one and the bit in the SRG Partial BSSID Bitmap field that corresponds to the numerical value of RA [39:44] is set to one; or 4) the RXVECTOR parameter UPLINK_FLAG of the received HE PPDU is set to zero and the bit in the SRG Partial BSSID Bitmap field that corresponds to the numerical value of TA [39:44] is set to one.

A received PPDU that is an inter-BSS PPDU is an SRG PPDU if BSSID information from a MPDU of the PPDU is correctly received and the bit in the SRG Partial BSSID Bitmap field that corresponds to the numerical value of BSSID [39:44] is set to one; otherwise, the PPDU is not determined to be an SRG PPDU. When the MPDU is a Data or Management frame, the BSSID information is obtained from the BSSID field. When the MPDU is a Control frame, the BSSID information is obtained from the TA field if the receiver address (RA) field is set to a broadcast address. When the MPDU is a Control frame, the BSSID information is obtained from the RA field if the RXVECTOR parameter UPLINK_FLAG is present and set to one. When the MPDU is a Control frame having the TA field, the BSSID information is obtained from the TA field if the RXVECTOR parameter UPLINK_FLAG is present and set to zero. When the MPDU is a Control frame having the TA field, the BSSID information is obtained from the TA field if the RXVECTOR parameter GROUP_ID is present and set to 63.

Stations in the network 100 may simultaneously send PLCP service data units (PSDUs) in the PPDU frame format on their allocated subchannels or on their allocated spatial streams to an AP, and may simultaneously receive PSDUs in the PPDU frame format on their allocated subchannels or on their allocated spatial streams from the AP.

Figure 2A:
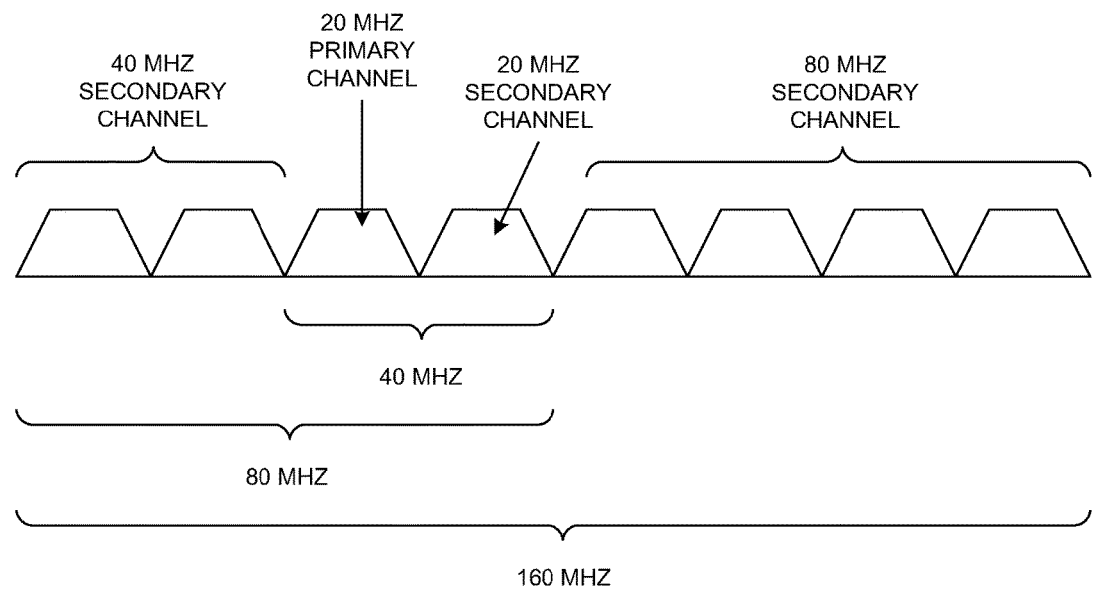
FIGS. 2A and 2B depict operating channels in the network in embodiments according to the present invention.
Figure 2B:
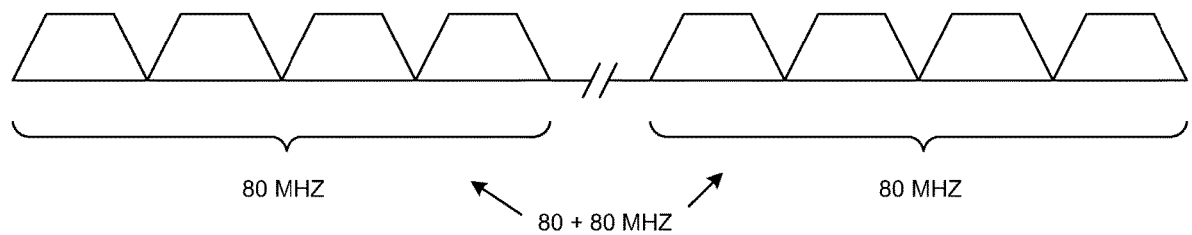

FIGS. 2A and 2B depict operating channels in the network 100 in embodiments according to the present invention. The network 100 may support a single channel having a bandwidth of 20 megahertz (MHz) as a BSS operating channel. The network 100 may also support a BSS operating channel having a bandwidth of 40 MHz, 80 MHz, or 160 MHz, by bonding contiguous 20 MHz channels as shown in FIG. 2A. Also, the network 100 may support a BSS operating channel having a bandwidth of 160 MHz including non-contiguous 80-MHz channels (called an 80+80 MHz channel) as shown in FIG. 2B.

A primary channel is defined as a common channel for all STAs within a BSS. The primary channel may be used for transmission of a basic signal such as a beacon. The primary channel may also be a basic channel used for transmission of a data unit (e.g., a PPDU). If a STA uses a channel width larger than the channel width of the primary channel, the STA may use another channel in addition to the primary channel. The additional channel is referred to as a secondary channel.

Thus, as illustrated in FIG. 2A, one 40 MHz channel may include a primary 20 MHz channel and a secondary 20 MHz channel that are contiguous. One 80 MHz channel may include a primary 40 MHz channel and a secondary 40-MHz channel that are contiguous. One 160 MHz channel may include a primary 80 MHz channel and a secondary 80 MHz channel that are contiguous. As illustrated in FIG. 2B, one 80+80 MHz channel may include a primary 80 MHz channel and a secondary 80 MHz channel that are non-contiguous.

Figure 3:
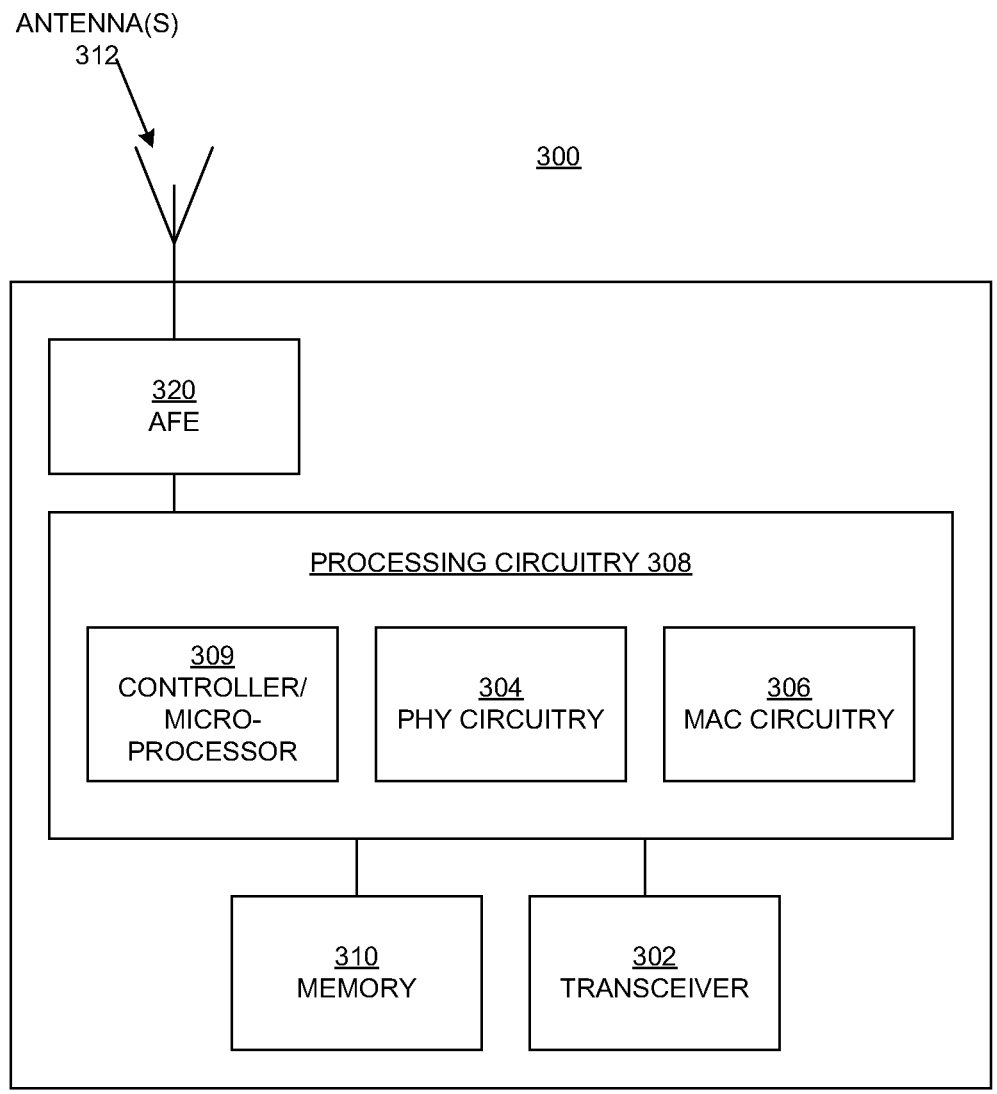
FIG. 3 is a block diagram of an example of a wireless device upon which embodiments according to the present invention can be performed.

FIG. 3 is a block diagram of an example of a wireless device 300 upon which embodiments according to the present invention can be performed. In embodiments, the wireless device 300 is an HE device or an HE-compliant device. With reference to FIG. 1, the wireless device 300 may be a STA 112 or 116 in the wireless network 100, and/or it may be an AP 114 or 118 in the wireless network. In embodiments, the wireless device 300 is configured to operate in accordance with one or more wireless communication standards as described herein, including IEEE 802.11ax.

The wireless device 300 of FIG. 3 is a device with wireless communication capability such as, but not limited to, a smartphone, a laptop or portable computer, a tablet, a headset, a digital camera, a television, and a monitoring device.

In the example of FIG. 3, the wireless device 300 includes processing circuitry 308. The processing circuitry 308 includes, for example, a controller or microprocessor 309. The processing circuitry 308 also includes physical layer circuitry (PHY circuitry) 304 and media access control layer circuitry (MAC circuitry) 306, one or more of which enables transmission and reception of signals to and from other wireless devices using one or more antennas 312. The wireless device 300 includes a transceiver 302, which includes a transmitter and a receiver.

The antenna(s) 312 can be coupled to an analog front end (AFE) module 320, which enables processing of a received modulated signal and signal conditioning for a transmitted signal. The AFE 320 can be functionally located between the antenna and a digital baseband system, to convert an analog signal into a digital signal for processing, and vice versa.

The wireless device 300 also includes memory 310 that stores instructions and other information used to perform the operations described herein. The wireless device 300 is configured to decode and/or encode data units (signals, packets, and/or frames) such as PPDUs.

The PHY circuitry 304 is configured to transmit a PPDU. The PHY circuitry 304 can include, for example, circuitry for modulation and demodulation, up-conversion and down-conversion, filtering, and amplification. The PHY circuitry 304 can perform functions based on instructions stored in the memory 310.

The MAC circuitry 306 is configured to contend for a wireless medium during a contention period to receive control of the medium and to configure a PPDU. In some embodiments, the MAC circuitry 306 is configured to contend for the wireless medium based on channel contention settings, a transmitting power level, and/or a clear channel assessment (CCA) state (e.g., busy or idle).

The wireless device 300 can include components other than those illustrated or described herein, such as but not limited to a keyboard, a display, a non-volatile memory port, a power management device, and a graphics processor. Also, although the device 300 is illustrated as having several separate functional elements, one or more of the functional elements may be combined and/or may be implemented by combinations of software-configured and/or hardware-configured elements.

Secondary Channel Spatial Reuse Ina Wireless Network

In embodiments, the memory 310 stores instructions that implement a spatial reuse manager application. In operation, using the spatial reuse manager application in conjunction with other components such as the PHY circuitry 304 and the MAC circuitry 306, the device 300 may ignore (disregard) an OBSS PPDU with a valid PHY header that has a receive power (received signal strength indication, RSSI) above a minimum power density (signal detection) threshold (see FIG. 4A). That is, under those conditions, the device 300 will treat an inter-BSS PPDU as not having been received at all: the device 300 will not update the network allocation vector (NAV), and resets the CCA state from busy to idle before the PPDU is completely received. More specifically, the device 300 does not update its NAV timers based on frames carried in the detected PPDU, and the device's MAC circuitry 306 issues a PHY-CCARESET.request primitive before the end of the PPDU. The effect of receipt of this primitive by the PHY circuitry 304 is to reset the PHY CCA timers to the state appropriate for the end of a received frame and to initiate a new CCA evaluation cycle.

Even more specifically, according to IEEE 802.11ax, a non-SRG SR mechanism is described as follows.

If the PHY of a STA issues a PHY-CCA.indication with a value equal to BUSY followed by an RXSTART.indication due to a PPDU reception, then the STA's MAC sublayer may a) issue a PHY-CCARESET.request primitive before the end of the PPDU and b) not update its NAV timers based on frames carried in the PPDU (thus ignoring the PPDU) if all the following conditions are met: 1) the STA has not set the TXVECTOR parameter SPATIAL_REUSE to the value SRP_and_NON_SRG_OBSS_PD_PROHIBITED in any HE PPDU it has transmitted in the current beacon period; 2) the received PPDU is an inter-BSS PPDU and the received PPDU is not a non-HT (high throughput) PPDU carrying a response frame (Ack, BlockAck or CTS frame), or the received PPDU contains a CTS and a PHY-CCA.indication transition from BUSY to IDLE occurred within the point interframe space (PIFS) time immediately preceding the received CTS and that transition corresponded to the end of an inter-BSS PPDU that contained a RTS that was ignored following this procedure; 3) the SPATIAL_REUSE subfield in the HE-SIG-A (if present) of the received PPDU is not set to SRP_AND_NON_SRG_OBSS_PD_PROHIBITED; 4) the RXVECTOR parameter RSSI_LEGACY in the PHY-RXSTART.indication primitive, which defines the received power level measured from the legacy portion of the PPDU, is below the Non-SRG OBSS_PD level; and 5) the PPDU is not one of the following: i) a non-HE PPDU that carries a frame where the RA field is equal to the STA MAC address; ii) a non-HE PPDU that carries a group addressed Public Action frame; iii) a non-HE PPDU that carries a null data packet (NDP) Announcement frame or a fine timing measurement (FTM) frame; or iv) an NDP.

Also, according to IEEE 802.11ax, the SRG SR mechanism is more specifically described as follows.

If the PHY of a STA issues a PHY-CCA.indication with a value equal to BUSY followed by a PHYRXSTART.indication due to a PPDU reception then the STA's MAC sublayer may a) issue a PHY-CCARESET.request primitive before the end of the PPDU and b) not update its NAV timers based on frames carried in the PPDU (thus ignoring the PPDU) if all the following conditions are met: 1) the received PPDU is an Inter-BSS PPDU; 2) the received PPDU is an SRG PPDU; 3) the most recently received SR Parameter Set element from the AP associated with the STA had the SRG Information Present subfield equal to one or the STA is an AP and its most recently transmitted SR Parameter Set element had the SRG Information Present subfield equal to one; 3) the RXVECTOR parameter RSSI_LEGACY in the PHY-RXSTART.indication primitive, which defines the received power level measured from the legacy portion of the PPDU is below the SRG OBSS_PD level defined in section 27.9.2.2 of the standard; 4) the PPDU is not one of the following: i) a non-HE PPDU that carries a frame where the RA field is equal to the STA MAC address; ii) a non-HE PPDU that carries a Public Action frame; iii) a non-HE PPDU that carries an NDP Announcement frame or an FTM frame; or iv) an NDP.

According to IEEE 802.11ax, the SR mechanism includes the following SR transmit power restrictions.

If a STA ignores an inter-BSS PPDU following the procedure in section 27.9.2.1 of the standard, using a chosen SRG OBSS_PD level or a chosen non-SRG OBSS_PD level, then the STA starts an OBSS_PD SR transmit power restriction period. This OBSS_PD SR transmit power restriction period is terminated at the end of the TXOP that the STA gains once its backoff reaches zero. If a STA starts an OBSS_PD SR transmit power restriction period with a chosen non-SRG OBSS_PD level, the STA's power as measured at the output of the antenna connector shall be equal or lower than the TX_PWR$_{max}$, calculated with this chosen non-SRG OBSS_PD level with Equation 27-4 of the standard, with the appropriate non-SRG parameters according to Table 27-2 of the standard, for the transmissions of any PPDU (including an HE TB PPDU, except when the HE TB PPDU is triggered by a Trigger frame having the carrier sense (CS) Required subfield set to zero) until the end of the OBSS_PD SR transmit power restriction period. If a STA starts an OBSS_PD SR transmit power restriction period with a chosen non-SRG OBSS_PD level, the STA's power as measured at the output of the antenna connector shall be equal or lower than the TX_PWR$_{max}$, calculated with this chosen non-SRG OBSS_PD level with Equation 27-4 of the standard, with the appropriate non-SRG parameters according to Table 27-2 of the standard, for the transmissions of any PPDU (including an HE TB PPDU, except when the HE TB PPDU is triggered by a Trigger frame having the CS Required subfield set to zero) until the end of the OBSS_PD SR transmit power restriction period. If a STA starts an OBSS_PD SR transmit power restriction period with a chosen SRG OBSS_PD level, the STA's power as measured at the output of the antenna connector, shall be equal or lower than the TX_PWR$_{max}$, calculated with this chosen SRG OBSS_PD level with Equation 27-4 of the standard, with the appropriate SRG parameters according to Table 27-3 of the standard, for the transmissions of any PPDU (including HE Trigger-Based (TB) PPDU, except when the HE TB PPDU is triggered by a Trigger frame having the CS Required subfield set to zero) until the end of the OBSS_PD SR transmit power restriction period. Multiple ongoing OBSS_PD SR transmit power restriction periods may overlap in time.

Figure 4A:
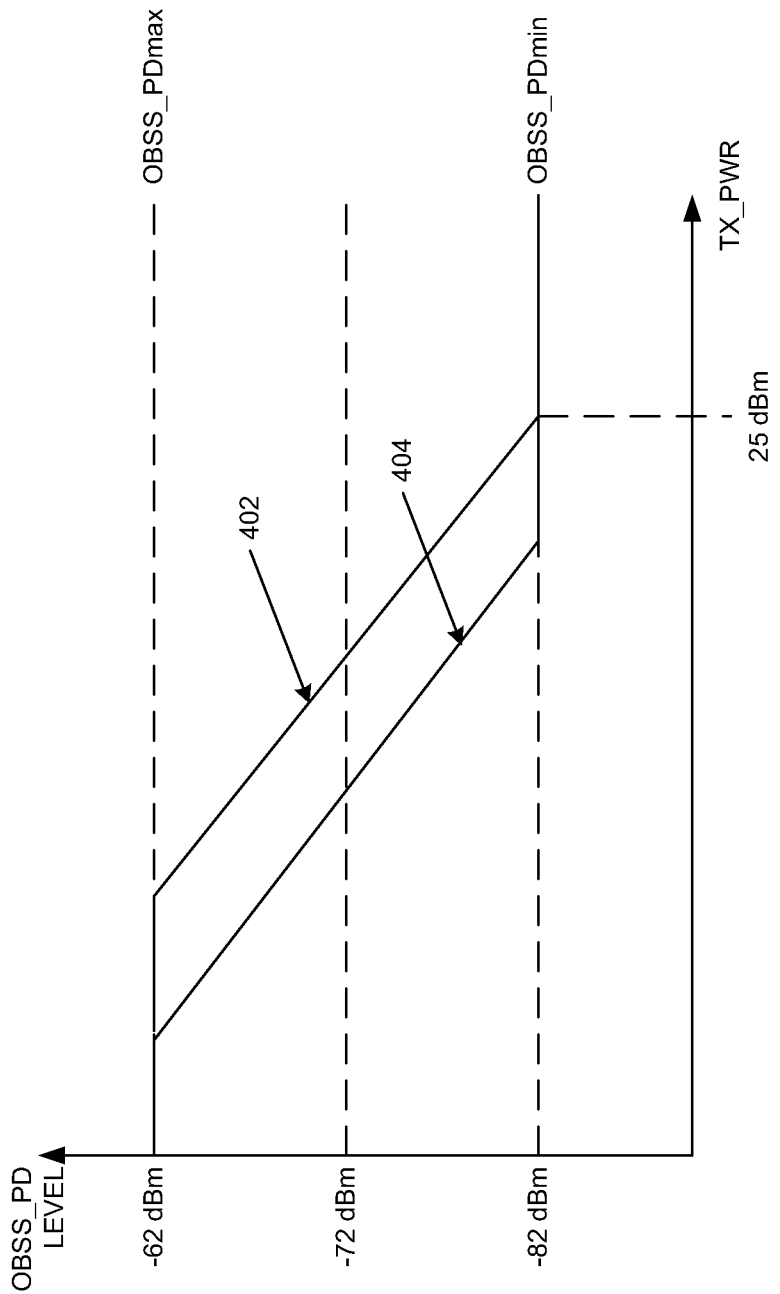
FIG. 4A illustrates the relationship between overlapping base service set power density thresholds and transmit power for non-spatial reuse groups in embodiments according to the present invention.

FIG. 4A illustrates the relationship between OBSS signal detection or power density (OBSS_PD) thresholds and transmit power (TX_PWR) in embodiments according to the present invention. The TX_PWR is the power used by an STA or AP to transmit packets. OBSS_PD and TX_PWR are both measured in units of decibel-milliwatts (dBm). The OBSS_PDmax and OBSS_PDmin thresholds are default (fixed) values specified in the IEEE 802.11 standard. In an embodiment, the OBSS_PD threshold range is −82 dBm to −62 dBm as a function of the transmit power TX_PWR. A baseline proportional rule allows the OBSS_PD threshold to be adjusted as long as the corresponding transmit power level falls below curve 402 for APs or curve 404 for STAs.

In embodiments, if the RSSI of a detected PPDU is below the applicable OBSS_PD threshold, then the PPDU may be ignored. In embodiments, the OBSS_PD threshold is also used by a STA or AP to determine whether or not to spatially reuse a channel. For example, if the RSSI of a PPDU is below the applicable OBSS_PD threshold, then the STA or AP may begin transmitting another PPDU while still receiving the PPDU.

As will be described, in embodiments according to the present invention, OBSS_PD thresholds different from those shown in FIG. 4A are applied in an SRG under certain conditions. More specifically, for an SRG operation and under certain other conditions described below, an AP can alter the OBSS_PDmin value (different from the default value of FIG. 4A) against an OBSS signal from within the same SRG. Accordingly, the OBSS_PD levels shown in FIG. 4A may be referred to herein as non-SRG OBSS_PD levels.

Figure 4B:
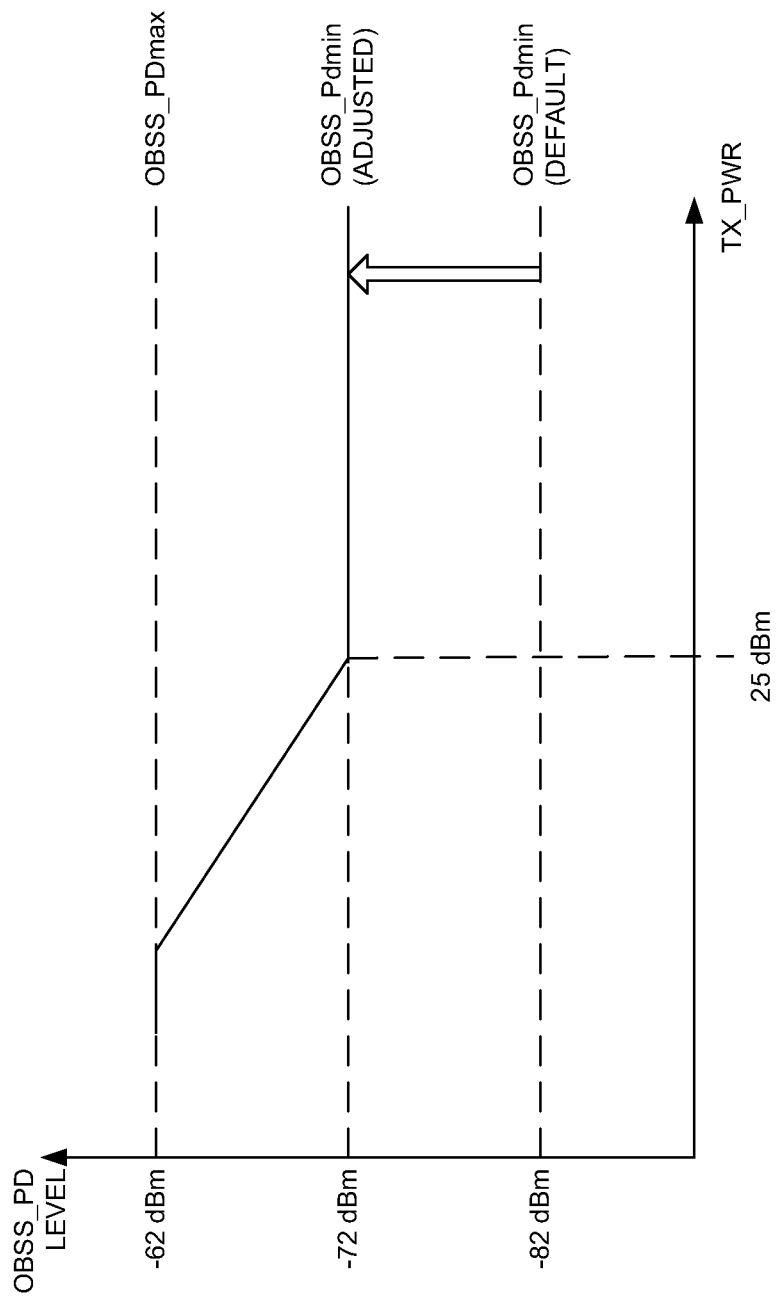
FIG. 4B illustrates the relationship between overlapping base service set power density thresholds and transmit power for spatial reuse groups in embodiments according to the present invention.

FIG. 4B illustrates the relationship between OBSS_PD thresholds and TX_PWR for SRG operations in embodiments according to the present invention. For an SRG operation, the OBSS power density threshold range for the SRG is −72 dBm to −62 dBm as a function of the transmit power TX_PWR. The OBSS_PD levels shown in FIG. 4B may be referred to herein as SRG OBSS_PD levels.

In embodiments, the conditions under which the SRG OBSS_PD thresholds of FIG. 4B are applied are now described. If the received PPDU occupies both a primary channel and a secondary channel, and if it is an SRG PPDU, then the SRG OBSS_PD thresholds can be applied on secondary channels under the following conditions: If a STA ignored a 40 MHz/80 MHz/160 MHz/80+80 MHz SRG PPDU using a chosen SRG OBSS_PD level (because all SRG SR mechanism conditions described above are met), then it stores the RXVECTOR parameter CH_BANDWIDTH (channel bandwidth) and the RXTIME (receive duration time) of the detected SRG PPDU. During the RXTIME of the SRG OBSS PPDU, the SRG OBSS_PD thresholds of FIG. 4B are applied on the secondary channels that are within the RXVECTOR parameter CH_BANDWIDTH. The secondary channels that are not within the RXVECTOR parameter CH_BANDWIDTH still use non-SRG OBSS_PD thresholds such as those shown in FIG. 4A.

Thus, in embodiments according to the present invention, the minimum SRG OBSS_PD threshold is increased on the secondary channels that are within the channel bandwidth of a PPDU. In other words, relative to the non-SRG OBSS_PD level versus TX_PWR curve 402 for APs shown in FIG. 4A, the OBSS_PDmin level in the same SRG is raised on the secondary channels that are within the channel bandwidth of the PPDU.

As a result of the improvements just described, weaker inter-BSS signals on those channels will not cause those secondary channels to be identified as being busy. Instead, those secondary channels can be identified as being idle and available for spatial reuse. With more channels available, overall network-level performance is increased.

Those improvements can be incorporated into the IEEE 802.11ax standard by modifying section 28.3.19.6.4 of the standard to state the following: "OBSS_PD$_{level}$ is defined in 27.9.2.4 (Adjustment of OBSS_PD and transmit power) and only applied in the equations to define the detection level in this subclause when an HE STA ignored a 40 MHz/80 MHz/160 MHz/80+80 MHz inter-BSS PPDU following the procedure in 27.9.2.2 (General operation with non-SRG OBSS_PD level) or 27.9.2.3 (General operation with SRG OBSS_PD level). It is applied to any secondary channels within the PPDU bandwidth of the inter-BSS PPDU and during the RXTIME of the inter-BSS PPDU. Otherwise, OBSS_PD$_{level}$ is not applied in the equations to define the detection level in this subclause."

Figure 5:
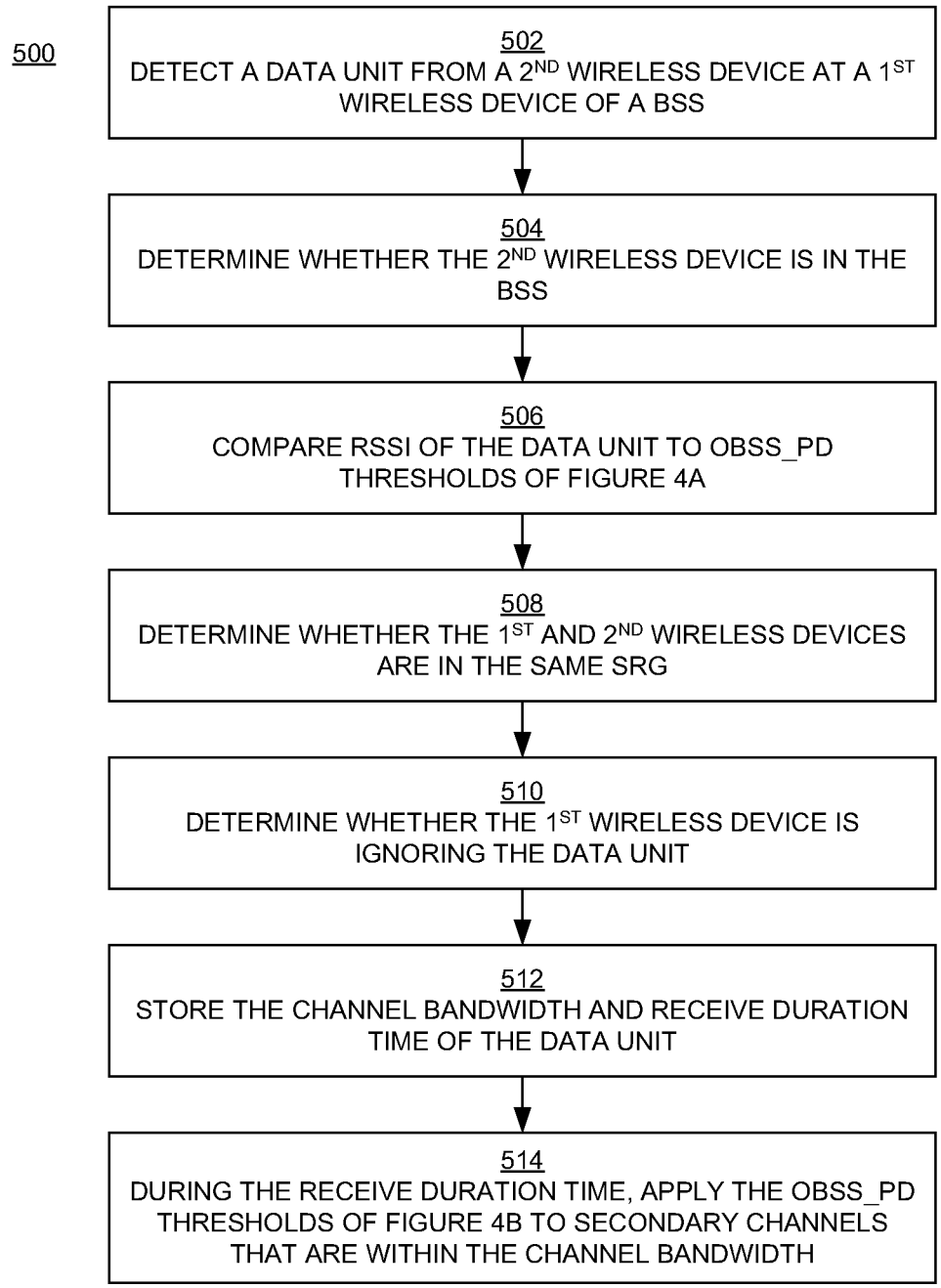
FIG. 5 is a flowchart of examples of operations in device-implemented methods for secondary channel spatial reuse in a wireless network in embodiments according to the present invention.

FIG. 5 is a flowchart 500 of examples of operations in a device-implemented method for secondary channel spatial reuse in a wireless network in embodiments according to the present invention. The operations can be performed in and by, for example, the wireless device 300 of FIG. 3. The operations described below are not necessarily performed in the order in which they are described.

In block 502 of FIG. 5, a data unit (e.g., a PPDU) from a second wireless device is detected at a first wireless device of a BSS. The data unit occupies both a primary channel and a secondary channel of the wireless network.

In block 504, in embodiments, a determination is made with regard to whether the second wireless device is in an OBSS. The received data unit can be identified as being from an OBSS via its BSS color (e.g., the bit value of the BSS_COLOR parameter of the RXVECTOR) or other means.

In block 506, in embodiments, the RSSI of the data unit is compared to the OBSS_PD thresholds of FIG. 4A. The wireless medium may still be considered idle and the first wireless station can still initiate a new transmission even if the data unit is from an OBSS and the RSSI exceeds the lowest threshold (OBSS_PDmin), provided that the transmit power (TX_PWR) is decreased as shown in FIG. 4A.

In block 508 of FIG. 5, in embodiments, if the second wireless device is in an OBSS, then a determination is made with regard to whether the first and second wireless devices are in the same SRG. The received OBSS data unit can be identified as being from the same SRG as previously described herein.

In block 510, in embodiments, the first wireless device may ignore the data unit. The first wireless device ignores the data unit by not setting a NAV timer based on frames in the data unit and resetting the CCA state from busy to idle before all frames of the data unit are received by the first station.

In block 512, in embodiments, if the first and second wireless devices are in the same SRG, and if the first wireless device ignores the data unit, then the first wireless device stores the channel bandwidth (RXVECTOR parameter CH_BANDWIDTH) of the data unit and the receive duration time (RXTIME) of the data unit.

In block 514, during the receive duration time of the data unit, the SRG OBSS_PD thresholds of FIG. 4B are applied to secondary channels that are within the channel bandwidth of the data unit, instead of applying the non-SRG OBSS_PD thresholds of FIG. 4A on these secondary channels.

In an embodiment, non-SRG OBSS_PD thresholds such as those of FIG. 4A are applied to secondary channels that are not within the channel bandwidth of the data unit.

With reference to FIGS. 4A, 4B, and 5, the value of the OBSS_PD level is applicable to the start of a 20 MHz PPDU received on a primary 20 MHz channel. If the bandwidth of the received PPDU differs from 20 MHz, then the value of the OBSS_PD level is increased by 10 log(bandwidth/20 MHz). RTS and CTS frames are usually transmitted in a non-HT PPDU or a non-HT Duplicate PPDU, so when a STA receives RTS and CTS frames, it is not obvious to determine the bandwidth of the received PPDU.

The RXVECTOR represents a list of parameters that the PHY layer provides to the local MAC layer, when the PHY layer receives a valid PHY header or the last PSDU data bit of a received frame. Therefore, in embodiments according to the present invention, if a STA receives a Control frame (including a RTS) transmitted in a non-HT or non-HT duplicate PPDU that has a bandwidth signaling a TA and that has the RXVECTOR parameter CH_BANDWIDTH_IN_NON_HT, the bandwidth of the received PPDU is determined to be the bandwidth indicated by the RXVECTOR parameter CH_BANDWIDTH_IN_NON_HT; or if a STA receives a Trigger frame (including multi-user RTS) transmitted in a non-HT or non-HT duplicate PPDU, the bandwidth of the received PPDU is determined to be the bandwidth indicated by the bandwidth (BW) field in the Common Info field of the Trigger frame; otherwise, the bandwidth of the received PPDU is determined to be the bandwidth indicated by the RXVECTOR parameter CH_BANDWIDTH.

TXVECTOR CH_BANDWIDTH_IN_NON_HT: If present, the allowed values for CH_BANDWIDTH_IN_NON_HT are CBW20, CBW40, CBW80, CBW160, and CBW80+80 (see FIGS. 2A and 2B). If present, this parameter is used to modify the first seven bits of the scrambling sequence to indicate the bandwidth of the non-HT duplicate PPDU.

RXVECTOR CH_BANDWIDTH_IN_NON_HT: If present, the allowed values for CH_BANDWIDTH_IN_NON_HT are CBW20, CBW40, CBW80, CBW160, and CBW80+80. If present and valid, this parameter indicates the bandwidth of the non-HT duplicate PPDU. This parameter is used by the MAC only when valid (see 10.3.2.8 and 10.7.6.6 of the IEEE 802.11ax standard).

Regarding channel width in non-HT and non-HT duplicate PPDUs, a non-VHT STA should include neither the CH_BANDWIDTH_IN_NON_HT parameter nor the DYN_BANDWIDTH_IN_NON_HT parameter in either of the TXVECTOR or RXVECTOR for NON HT PPDUs. A non-VHT STA should not set the TA field to a bandwidth signaling TA. A VHT STA should include neither the CH_BANDWIDTH_IN_NON_HT parameter nor the DYN_BANDWIDTH_IN_NON_HT parameter in the TXVECTOR of a non-HT PPDU addressed to a non-VHT STA. A VHT STA should not set the TA field to a bandwidth signaling TA in a frame addressed to a non-VHT STA. A VHT STA that includes the DYN_BANDWIDTH_IN_NON_HT parameter in the TXVECTOR should also include the CH_BANDWIDTH_IN_NON_HT parameter in the TXVECTOR. A VHT STA should not include the DYN_BANDWIDTH_IN_NON_HT parameter in the TXVECTOR for transmitted frames other than RTS frames with bandwidth signaling TA and that are sent in a non-HT PPDU. A STA that transmits an RTS frame with a bandwidth signaling TA should include the DYN_BANDWIDTH_IN_NON_HT parameter in the TXVECTOR. A VHT STA should include both the CH_BANDWIDTH_IN_NON_HT and DYN_BANDWIDTH_IN_NON_HT parameters in the RXVECTOR if the detected PPDU format is NON_HT. A bandwidth signaling TA may be included in non-HT and non-HT duplicate PPDUs and should not be included in other PPDUs. If the TXVECTOR parameter CH_BANDWIDTH_IN_NON_HT is present and a control MPDU other than a CTS is being transmitted, then the TA field should be set to a bandwidth signaling TA; otherwise, the TA field should be set to an individual address. Note that a CTS frame, even though it does not have a TA field, can also be transmitted with the TXVECTOR parameter CH_BANDWIDTH_IN_NON_HT present.

To apply two different OBSS_PD thresholds on the secondary channels depending on whether the received PPDU is a non-SRG PPDU or a SRG PPDU, management information base (MIB) variables for OBSS_PD thresholds on the secondary channels are dynamically selected as described below.

When a STA enables SR on a secondary 20 MHz channel, dot11OBSSPDlevelOnSecondary20 is set to a SRG OBSS_PD level during the RXTIME of the received PPDU if the received PPDU is a 40 MHz/80 MHz/160 MHz/80+80 MHz SRG PPDU; otherwise, it is set to a non-SRG OBSS_PD level. When the dot11OBSSPDlevelOnSecondary20 is set to a SRG OBSS_PD level, a TXOP holder transmitting a 40 MHz/80 MHz/160 MHz/80+80 MHz PPDU sets its power as measured at the output of the antenna connector to be equal to or lower than the $TXPWR_{max}$, calculated with the chosen SRG OBSS_PD level with Equation 27-4 of the IEEE 802.11ax standard. When the dot11OBSSPDlevelOnSecondary20 is set to a non-SRG OBSS_PD level, a TXOP holder transmitting a 40 MHz/80 MHz/160 MHz/80+80 MHz PPDU sets its power as measured at the output of the antenna connector to be equal to or lower than the $TXPWR_{max}$, calculated with the chosen non-SRG OBSS_PD level with Equation 27-4 of the standard.

When a STA enables a spatial reuse on a secondary 40 MHz channel, dot11OBSSPDlevelOnSecondary40 is set to a SRG OBSS_PD level during the RXTIME of the received PPDU if the received PPDU is an 80 MHz/160 MHz/80+80 MHz SRG PPDU; otherwise, it is set to a non-SRG OBSS_PD level. When the dot11OBSSPDlevelOnSecondary40 is set to a SRG OBSS_PD level, a TXOP holder transmitting an 80 MHz/160 MHz/80+80 MHz PPDU sets its power as measured at the output of the antenna connector to be equal to or lower than the $TXPWR_{max}$, calculated with the chosen SRG OBSS_PD level with Equation 27-4 of the standard. When the dot11OBSSPDlevelOnSecondary40 is set to a non-SRG OBSS_PD level, a TXOP holder transmitting an 80 MHz/160 MHz/80+80 MHz PPDU sets its power as measured at the output of the antenna connector to be equal to or lower than the $TXPWR_{max}$, calculated with the chosen non-SRG OBSS_PD level with Equation 27-4 of the standard.

When a STA enables a spatial reuse on a secondary 80 MHz channel, dot11OBSSPDlevelOnSecondary80 is set to a SRG OBSS_PD level during the RXTIME of the received PPDU if the received PPDU is a 160 MHz/80+80 MHz SRG PPDU; otherwise, it is set to a non-SRG OBSS_PD level. When the dot11OBSSPDlevelOnSecondary80 is set to a SRG OBSS_PD level, a TXOP holder transmitting a 160 MHz/80+80 MHz PPDU sets its power as measured at the output of the antenna connector to be equal to or lower than the $TXPWR_{max}$, calculated with the chosen SRG OBSS_PD level with Equation 27-4 of the standard. When the dot11OBSSPDlevelOnSecondary80 is set to a non-SRG OBSS_PD level, a TXOP holder transmitting an 160 MHz/80+80 MHz PPDU sets its power as measured at the output of the antenna connector to be equal to or lower than the $TXPWR_{max}$, calculated with the chosen non-SRG OBSS_PD level with Equation 27-4 of the standard.

When the OBSS_PD is applied on the CCA of multiple secondary channels, previous rules applied to the corresponding secondary channels have to be satisfied. That is, a maximum value of dot11OBSSPDlevelOnSecondary20, dot11OBSSPDlevelOnSecondary40, and dot11OBSSPDlevelOnSecondary80 is used as the $OBSS\_PD_{level}$ value of Equation 27-4 of the standard for the SR transmit power restriction calculation.

Thus, embodiments according to the present invention provide methods (and devices and networks that implement those methods) for spatially reusing channels, particularly secondary channels.

Embodiments according to the invention thus improve computer technologies (e.g., by improving the efficiency and performance of wireless communication devices) and computer-related technologies (e.g., by improving the quality and performance of wireless mesh networks).

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the present invention.

Embodiments according to the invention are thus described. While the present invention has been described in particular embodiments, it should be appreciated that the invention should not be construed as limited by such embodiments, but rather construed according to the following claims.

What is claimed is:

1. A method for secondary channel spatial reuse in a wireless network, the method comprising:
    detecting a data unit at a first wireless device of a first basic service set (BSS), the data unit sent on a channel from a second wireless device of a second overlapping basic service set (OBSS), the data unit having a channel bandwidth that occupies both a primary channel and a secondary channel of the wireless network;
    ignoring the data unit after detecting the data unit;
    determining whether the first wireless device and the second wireless device are in a same spatial reuse group (SRG);
    when the first wireless device and the second wireless device are in the same SRG, then during a receive duration time of the data unit, applying an SRG OBSS power density threshold to secondary channels that are within the channel bandwidth of the data unit; and
    when the first wireless device and the second wireless device are not in the same SRG, then applying a non-SRG OBSS power density threshold on the secondary channels that are within the channel bandwidth of the data unit.

2. The method of claim 1, further comprising storing, at the first wireless device, the channel bandwidth of the data unit and the receive duration time of the data unit.

3. The method of claim 1, wherein the data unit is a physical layer convergence procedure (PLCP) protocol data unit (PPDU).

4. The method of claim 1, wherein the SRG OBSS power density threshold range is −72 decibel-milliwatts (dBm) to −62 dBm as a function of transmit power, and wherein the non-SRG power density threshold range is −82 dBm to −62 dBm as a function of transmit power.

5. The method of claim 1, wherein said ignoring comprises:

not setting a network allocation vector (NAV) timer based on frames in the data unit; and resetting a state of a clear channel assessment (CCA) for the channel from busy to idle before all frames of the data unit are received by the first wireless device.

6. The method of claim 1, further comprising applying the non-SRG OBSS power density threshold on secondary channels that are not within the channel bandwidth of the data unit.

7. The method of claim 1, wherein said detecting comprises determining whether the data unit was sent from the BSS or from the OBSS.

8. The method of claim 1, further comprising determining the channel bandwidth of the data unit using a list of parameters that a physical (PHY) layer of the wireless device provides to a media access control (MAC) layer of the first wireless device.

9. The method of claim 1, further comprising adjusting an OBSS power density threshold to generate the SRG OBSS power density threshold that is higher than the OBSS power density threshold.

10. The method of claim 1, wherein the non-SRG OBSS power density threshold has a maximum value and a minimum value and wherein the SRG OBSS power density threshold has a maximum value and a minimum value, and wherein the minimum value of the SRG OBSS power density threshold is greater than the minimum value of the non-SRG OBSS power density threshold.

11. A wireless device of a first basic service set (BSS), the wireless device comprising:
processing circuitry;
a transceiver coupled to the processing circuitry; and
memory coupled to the processing circuitry, the memory storing instructions that when executed by the wireless device cause the wireless device to perform a method for secondary channel spatial reuse in a wireless network, the method comprising:
detecting a data unit sent on a channel from a second wireless device of a second overlapping basic service set (OBSS), the data unit having a channel bandwidth that occupies both a primary channel and a secondary channel of the wireless network;
ignoring the data unit after detecting the data unit;
determining whether the wireless device and the second wireless device are in a same spatial reuse group (SRG);
when the wireless device and the second wireless device are in the same SRG, then during a receive duration time of the data unit, applying an SRG OBSS power density threshold to secondary channels that are within the channel bandwidth of the data unit; and
when the wireless device and the second wireless device are not in the same SRG, then applying a non-SRG OBSS power density threshold on the secondary channels that are within the channel bandwidth of the data unit.

12. The wireless device of claim 11, wherein the method further comprises storing, at the wireless device, the channel bandwidth of the data unit and the receive duration time of the data unit.

13. The wireless device of claim 11, wherein the data unit is a physical layer convergence procedure (PLCP) protocol data unit (PPDU).

14. The wireless device of claim 11, wherein the SRG OBSS power density threshold range is −72 decibel-milliwatts (dBm) to −62 dBm as a function of transmit power, and wherein the non-SRG power density threshold range is −82 dBm to −62 dBm as a function of transmit power.

15. The wireless device of claim 11, wherein the method further comprises:
not setting a network allocation vector (NAV) timer based on frames in the data unit; and
resetting a state of a clear channel assessment (CCA) for the channel from busy to idle before all frames of the data unit are received by the wireless device.

16. The wireless device of claim 11, wherein the method further comprises applying the non-SRG OBSS power density threshold on secondary channels that are not within the channel bandwidth of the data unit.

17. The wireless device of claim 11, wherein the method further comprises determining whether the data unit was sent from the BSS or from the OBSS.

18. The wireless device of claim 11, wherein the method further comprises determining the channel bandwidth of the data unit using a list of parameters that a physical (PHY) layer of the wireless device provides to a media access control (MAC) layer of the wireless device.

19. The wireless device of claim 11, wherein the method further comprises adjusting an OBSS power density threshold to generate the SRG OBSS power density threshold that is higher than the OBSS power density threshold.

20. The wireless device of claim 11, wherein the non-SRG OBSS power density threshold has a maximum value and a minimum value and wherein the SRG OBSS power density threshold has a maximum value and a minimum value, and wherein the minimum value of the SRG OBSS power density threshold is greater than the minimum value of the non-SRG OBSS power density threshold.

* * * * *